US012160296B2

(12) United States Patent
He et al.

(10) Patent No.: US 12,160,296 B2
(45) Date of Patent: Dec. 3, 2024

(54) METHODS AND APPARATUS FOR DEVICE TYPE AND CHANNEL STATE INFORMATION FEEDBACK OVER INITIAL ACCESS MESSAGE IN WIRELESS COMMUNICATION

(71) Applicant: Apple Inc., Cupertino, CA (US)

(72) Inventors: Hong He, San Jose, CA (US); Chunxuan Ye, San Diego, CA (US); Dawei Zhang, Saratoga, CA (US); Haitong Sun, Cupertino, CA (US); Oghenekome Oteri, San Diego, CA (US); Sigen Ye, Whitehouse Station, NJ (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,623

(22) PCT Filed: Jan. 14, 2021

(86) PCT No.: PCT/CN2021/071834
§ 371 (c)(1),
(2) Date: Sep. 21, 2021

(87) PCT Pub. No.: WO2022/151192
PCT Pub. Date: Jul. 21, 2022

(65) Prior Publication Data
US 2023/0361828 A1 Nov. 9, 2023

(51) Int. Cl.
H04B 7/06 (2006.01)
H04W 72/232 (2023.01)
(Continued)

(52) U.S. Cl.
CPC ........ *H04B 7/0626* (2013.01); *H04W 72/232* (2023.01); *H04W 74/0833* (2013.01)

(58) Field of Classification Search
CPC .............. H04B 7/0626; H04W 72/232; H04W 74/0833; E02F 9/2033; H04L 5/001; H04L 5/0057; H04L 5/0094
See application file for complete search history.

(56) References Cited

U.S. PATENT DOCUMENTS

2019/0215119 A1   7/2019  Kim
2022/0210806 A1*  6/2022  Rastegardoost ...... H04L 5/0051
(Continued)

FOREIGN PATENT DOCUMENTS

CN   107636997 A    1/2018
WO   2017078465 A1  5/2017
WO   2020033695 A1  2/2020

OTHER PUBLICATIONS

ZTE Corporation, "Feature lead summary on coverage enhancement for channels other than PUSCH and PUCCH," 3GPP TSG RAN WG1 #103-e R1-2009322, Nov. 1, 2020 (Nov. 1, 2020).
(Continued)

*Primary Examiner* — Awet Haile
(74) *Attorney, Agent, or Firm* — Blank Rome LLP

(57) ABSTRACT

Aspects herein relate to wireless devices, circuits, and methods for triggering earlier Channel State Information (CSI) feedback, comprising: transmitting, by a wireless device to a wireless station, an indication to provide earlier CSI feedback (e.g., wherein the indication comprises an indication that the wireless device has a reduced capability to receive messages); receiving from the wireless station, in response to the indication, a modified message (e.g., a Downlink Control Information or modified Medium Access Control Random Access Response), wherein the modified message triggers an earlier CSI feedback from the wireless
(Continued)

device; transmitting to the wireless station, in response to receiving the modified message, the earlier CSI feedback using a message related to a RACH procedure (e.g., a Msg3); and completing a connection to the wireless station, e.g., in response to a repeated number of initial access messages broadcast from the wireless station and based on the transmitted CSI feedback.

20 Claims, 7 Drawing Sheets

(51) Int. Cl.
*H04W 74/08* (2024.01)
*H04W 74/0833* (2024.01)

(56) References Cited

U.S. PATENT DOCUMENTS

| | | | | |
|---|---|---|---|---|
| 2022/0408292 | A1* | 12/2022 | He | H04L 5/0091 |
| 2023/0156807 | A1* | 5/2023 | Lei | H04L 5/0044 |
| | | | | 370/329 |
| 2023/0171809 | A1* | 6/2023 | Lin | H04L 5/0057 |
| | | | | 370/329 |
| 2023/0198593 | A1* | 6/2023 | Zhang | H04B 7/0632 |
| | | | | 370/329 |
| 2024/0032103 | A1* | 1/2024 | Rastegardoost | H04W 74/0833 |

OTHER PUBLICATIONS

Interdigital Inc: "Coverage enhancements for initial access", 3GPP Draft; R1-2008485, 3rd Generation Partnership Project (3GPP), Mobile Competence Centre ; 650, Route Des Lucioles ; F-06921 Sophia-Antipolis Cedex ; France, vol. RAN WG1, No. e-Meeting; Oct. 26, 2020-Nov. 13, 2020, Nov. 1, 2020 (Nov. 1, 2020), XP052350413, Retrieved from the Internet: URL:https://ftp.3gpp.org/tsg_ran/WG1_RL1/TSGR1_103-e/Docs/R1-2008485.zip R1-2008485_103e_COVE_AI8823_InitialAccess_SUBMIT.docx [retrieved on Nov. 1, 2020].

Futurewei: "Scoping for R17 RedCap WI", 3GPP Draft; RP-202180, 3rd Generation Partnership Project (3GPP), Mobile Competence Centre ; 650, Route Des Lucioles ; F-06921 Sophia-Antipolis Cedex ; France, vol. TSG RAN, No. e-meeting; Dec. 7, 2020-Dec. 11, 2020, Nov. 30, 2020 (Nov. 30, 2020), XP051962052, Retrieved from the Internet: URL:https://ftp.3gpp.org/tsg_ran/TSG_RAN/TSGR_90e/Docs/RP-202180.zip RP-202180.pdf [retrieved on Nov. 30, 2020].

Ericsson: "Study on support of reduced capability NR devices", 3GPP Draft; RP-202703, 3rd Generation Partnership Project (3GPP), Mobile Competence Centre ; 650, Route Des Lucioles ; F-06921 Sophia-Antipolis Cedex ; France, vol. TSG RAN, No. Electronic Meeting; Dec. 7, 2020-Dec. 11, 2020, Nov. 30, 2020 (Nov. 30, 2020), XP051963264, Retrieved from the Internet: URL:https://ftp.3gpp.org/tsg_ran/TSG_RAN/TSGR_90e/Docs/RP-202703.zip RP-202703 SR for Study on support of reduced capability NR devices.docx [retrieved on Nov. 30, 2020.

* cited by examiner

METHODS AND APPARATUS FOR DEVICE TYPE AND CHANNEL STATE INFORMATION FEEDBACK OVER INITIAL ACCESS MESSAGE IN WIRELESS COMMUNICATION

FIELD

The present application relates to wireless devices and wireless networks, including devices, circuits, and methods for providing feedback including device type information and/or Channel State Information (CSI) over initial access messages in wireless communication systems.

BACKGROUND

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) New Radio (NR) communication. Accordingly, improvements in the field in support of such development and design are desired.

SUMMARY

Aspects disclosed herein relate to wireless devices, circuits, and methods for transmitting, e.g., from a wireless device to a wireless station, a request to provide earlier Channel State Information (CSI) feedback from the wireless device (e.g., wherein the request comprises an indication that the wireless device has a reduced capability to receive messages relative to 3GPP Release-15 or Release-16 NR devices); receiving from the wireless station, in response to the request, a modified message, wherein the modified message triggers an earlier CSI feedback from the wireless device; transmitting to the wireless station, in response to receiving the modified message, the earlier CSI feedback using a message related to a RACH procedure; and completing a connection to the wireless station based, at least in part, on the transmitted earlier CSI feedback.

According to other aspects, network devices, circuits, and methods are disclosed for receiving, from a wireless device, e.g., at a wireless station, a request from a wireless device to provide earlier CSI feedback from the wireless device (e.g., wherein the request comprises an indication that the wireless device has a reduced capability to receive messages relative to Release-15 or Release-16 NR devices); transmitting, to the wireless device, in response to the request, a modified message, wherein the modified message triggers an earlier CSI feedback from the wireless device; receiving, at the wireless station, the earlier CSI feedback via a message related to a RACH procedure, and completing a connection to the wireless device based, at least in part, on the received earlier CSI feedback.

According to still other aspects, wireless devices, circuits, and methods are disclosed for receiving, e.g., at a wireless device from a wireless station, an indication that the wireless station is capable of receiving earlier CSI feedback from the wireless device; transmitting to the wireless station, in response to receiving the indication, the earlier CSI feedback using a message related to a RACH procedure; and completing a connection to the wireless station based, at least in part, on the transmitted earlier CSI feedback.

The techniques described herein may be implemented in and/or used with a number of different types of devices, including but not limited to cellular phones, wireless devices, wireless base stations, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

A better understanding of the present subject matter can be obtained when the following detailed description of various aspects is considered in conjunction with the following drawings.

Figure 1:
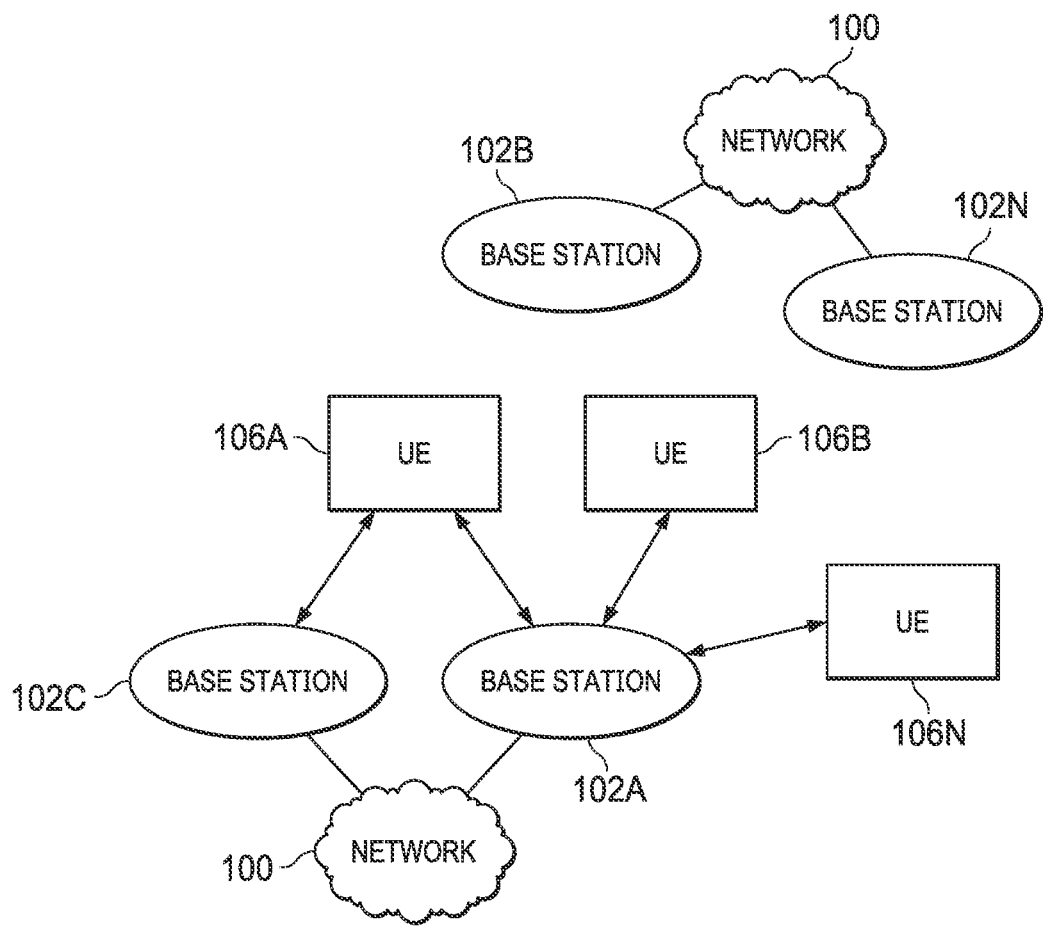
FIG. 1 illustrates an example wireless communication system, according to some aspects.

While the features described herein may be susceptible to various modifications and alternative forms, specific aspects thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

At the 3GPP RAN #86 meeting, a new Work Item (WI) was approved related to studying support for reduced capability (i.e., "Redcap") NR devices, with the intention to study a possible User Equipment (UE) feature and/or parameter list with lower-end capabilities, i.e., relative to the reception capabilities of Release-16 Enhanced Mobile Broadband (eMBB) and/or Ultra Reliable and Low Latency Communications (URLLC) NR devices.

As a few examples, it is clear that reducing the number of receiving (Rx) antennas available in a UE and/or reducing the UE's bandwidth (e.g., reducing bandwidth from 100 MHz to 20 MHz) would cause a coverage reduction, thereby resulting in smaller Transport Block Size (TBS) for not only unicast Physical Downlink Shared Channel (PDSCH) transmission—but also for broadcast messages, e.g., Msg2 transmissions used for initial access, i.e., Random Access Channel (RACH), procedures. [Other examples of potential reduced capabilities an NR device could have might include, e.g.: support only for half-duplex-FDD (i.e., as opposed to full-duplex-FDD), relaxed UE processing times, and/or relaxed UE processing capabilities.]

Studies have indicated that Msg4 coverage during initial access is also significantly impacted by reducing the number of Rx antennae available in a UE device (e.g., a reduction in number of Rx antennae from 4 to 1), and, hence, there is also a clear need to develop solutions to recover the coverage loss and to facilitate cell planning for operators, while achieving comparable coverage performance of reduced capacity UEs with regular eMBB UEs.

In addition, it would be beneficial, from operational perspective, to be able to identify distinct Redcap UE type(s), e.g., including identifying enumerated Redcap UE types based, at least in part, on their Rx antenna number and/or maximum supported bandwidth, for determining the most appropriate repetition number of broadcast messages, e.g., Msg4 messages, needed to achieve a comparable coverage with normal NR devices. As will be described throughout, the techniques described herein regarding improved methods of providing CSI feedback also have equal applicability to non-Redcap UE NR devices.

The following is a glossary of terms that may be used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (also "User Device" or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, wearable devices (e.g., smart watch, smart glasses), PDAs, portable Internet devices, music players, data storage devices, other handheld devices, in-vehicle infotainment (IVI), in-car entertainment (ICE) devices, an instrument cluster, head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine type communications (MTC) devices, machine-to-machine (M2M), internet of things (IoT) devices, etc. In general, the terms "UE" or "UE device" or "user device" can be broadly defined to encompass any electronic, computing, and/or telecommunications device (or combination of devices) that is easily transported by a user (or vehicle) and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The terms "base station," "wireless base station," or "wireless station" have the full breadth of their ordinary meaning, and at least includes a wireless communication station installed at a fixed location and used to communicate as part of a wireless telephone system or radio system. For example, if the base station is implemented in the context of LTE, it may alternately be referred to as an 'eNodeB' or 'eNB'. If the base station is implemented in the context of 5G NR, it may alternately be referred to as a 'gNodeB' or 'gNB'. Although certain aspects are described in the context of LTE or 5G NR, references to "eNB," "gNB," "nodeB," "base station," "NB," etc., may refer to one or more wireless nodes that service a cell to provide a wireless connection between user devices and a wider network generally and that the concepts discussed are not limited to any particular wireless technology. Although certain aspects are described in the context of LTE or 5G NR, references to "eNB," "gNB," "nodeB," "base station," "NB," etc., are not intended to limit the concepts discussed herein to any particular wireless technology and the concepts discussed may be applied in any wireless system.

Node—The term "node," or "wireless node" as used herein, may refer to one more apparatus associated with a cell that provide a wireless connection between user devices and a wired network generally.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form but not be involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some aspects, "approximately" may mean within 0.1% of some specified or desired value, while in various other aspects, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts. "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Example Wireless Communication System

Turning now to FIG. 1, a simplified example of a wireless communication system is illustrated, according to some aspects. It is noted that the system of FIG. 1 is merely one example of a possible system, and that features of this disclosure may be implemented in any of various systems, as desired.

As shown, the example wireless communication system includes a base station 102A, which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

In some aspects, the UEs 106 may be IoT UEs, which may comprise a network access layer designed for low-power IoT applications utilizing short-lived UE connections. An IoT UE can utilize technologies such as M2M or MTC for exchanging data with an MTC server or device via a public land mobile network (PLMN), proximity service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. As an example, vehicles to everything (V2X) may utilize ProSe features using a PC5 interface for direct communications between devices. The IoT UEs may also execute background applications (e.g., keep-alive messages, status updates, etc.) to facilitate the connections of the IoT network.

As shown, the UEs 106, such as UE 106A and UE 106B, may directly exchange communication data via a PC5 interface 108. The PC5 interface 105 may comprise one or more logical channels, including but not limited to a Physical Sidelink Shared Channel (PSSCH), a Physical Sidelink Control Channel (PSCCH), a Physical Sidelink Broadcast Channel (PSBCH), and a Physical Sidelink Feedback Channel (PSFCH).

In V2X scenarios, one or more of the base stations 102 may be or act as Road Side Units (RSUs). The term RSU may refer to any transportation infrastructure entity used for V2X communications. An RSU may be implemented in or by a suitable wireless node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Intelligent Transport Systems (ITS) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communications. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells." Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some aspects, base station 102A may be a next generation base station, e.g., a 5G New Radio (5G NR) base station, or "gNB." In some aspects, a gNB may be connected to a legacy evolved packet core (EPC) network and/or to a NR core (NRC)/5G core (5GC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station). For example, as illustrated in FIG. 1, both base station 102A and base station 102C are shown as serving UE 106A.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE. LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

Example User Equipment (UE)

Figure 2:
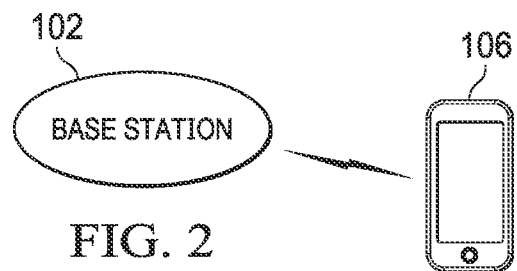
FIG. 2 illustrates a base station (BS) in communication with a user equipment (UE) device, according to some aspects.

FIG. 2 illustrates user equipment 106 (e.g., one of the devices 106A through 106N) in communication with a base station 102, according to some aspects. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method aspects described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method aspects described herein, or any portion of any of the method aspects described herein.

The UE 106 may include one or more antennas for communicating using one or more wireless communication protocols or technologies. In some aspects, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some aspects, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

In some aspects, a downlink resource grid can be used for downlink transmissions from any of the base stations 102 to the UEs 106, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid may comprise a number of resource blocks, which describe the mapping of certain physical channels to resource elements. Each resource block comprises a collection of resource elements. There are several different physical downlink channels that are conveyed using such resource blocks.

The physical downlink shared channel (PDSCH) may carry user data and higher-layer signaling to the UEs 106. The physical downlink control channel (PDCCH) may carry information about the transport format and resource allocations related to the PDSCH channel, among other things. It may also inform the UEs 106 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the base stations 102 based on channel quality information fed back from any of the UEs 106. The downlink resource assignment information may be sent on the PDCCH used for (e.g., assigned to) each of the UEs.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Example Communication Device

Figure 3:
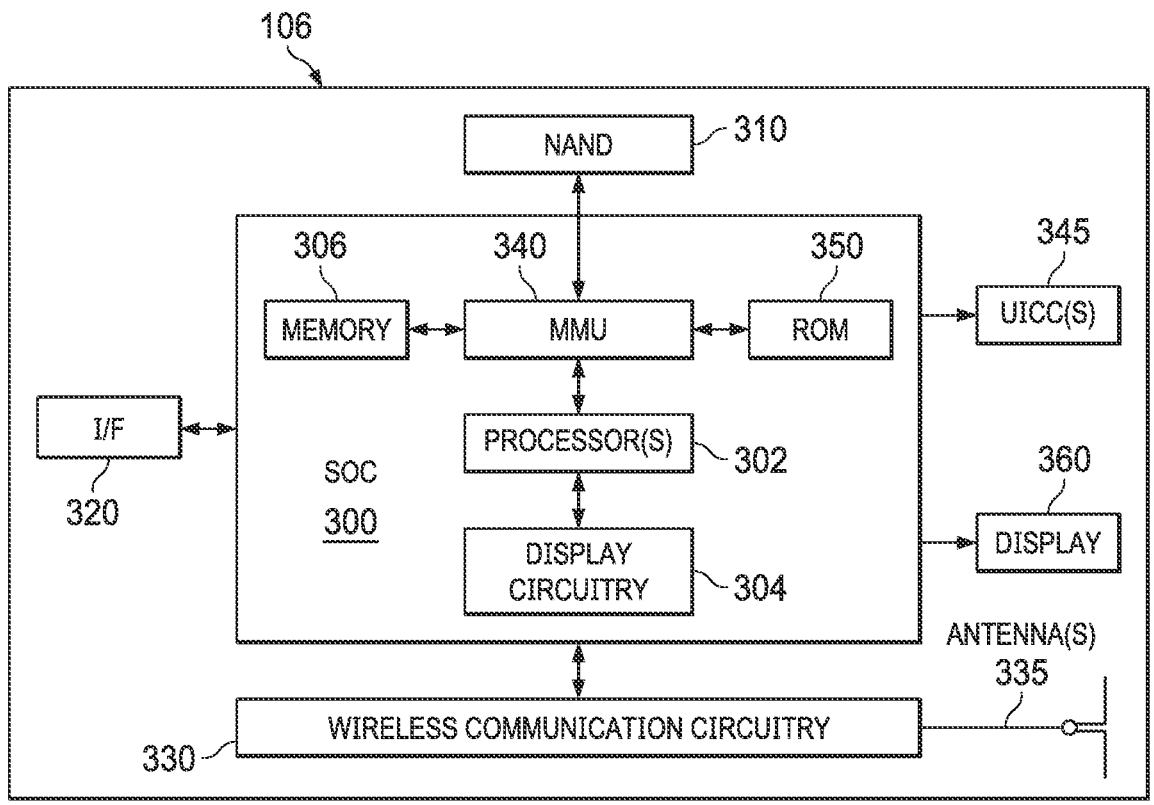
FIG. 3 illustrates an example block diagram of a UE, according to some aspects.

FIG. 3 illustrates an example simplified block diagram of a communication device 106, according to some aspects. It is noted that the block diagram of the communication device of FIG. 3 is only one example of a possible communication device. According to aspects, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some aspects, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some aspects, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some aspects, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain. In some aspects, the second RAT may operate at mmWave frequencies. As mmWave systems operate in higher frequencies than typically found in LTE systems, signals in the mmWave frequency range are heavily attenuated by environmental factors. To help address this attenuating, mmWave systems often utilize beamforming and include more antennas as compared LTE systems. These antennas may be organized into antenna arrays or panels made up of individual antenna elements. These antenna arrays may be coupled to the radio chains.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some aspects, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Example Base Station

Figure 4:
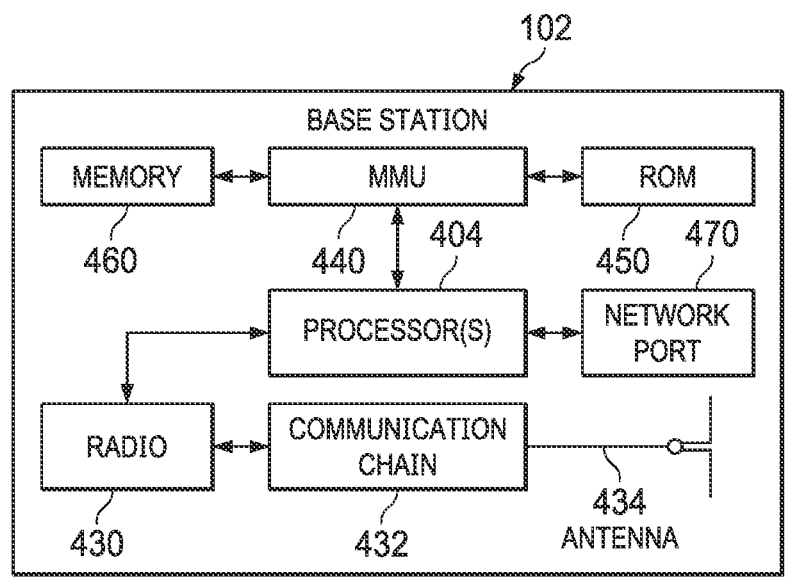
FIG. 4 illustrates an example block diagram of a BS, according to some aspects.

FIG. 4 illustrates an example block diagram of a base station 102, according to some aspects. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some aspects, base station 102 may be a next generation base station, e.g., a 5G New Radio (5G NR) base station, or "gNB." In such aspects, base station 102 may be connected to a legacy evolved packet core (EPC) network and/or to a NR core (NRC)/5G core (5GC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. When the base station 102 supports mmWave, the 5G NR radio may be coupled to one or more mmWave antenna arrays or panels. As another possibility, the base station 102 may include a multi-mode radio, which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Example Cellular Communication Circuitry

Figure 5:
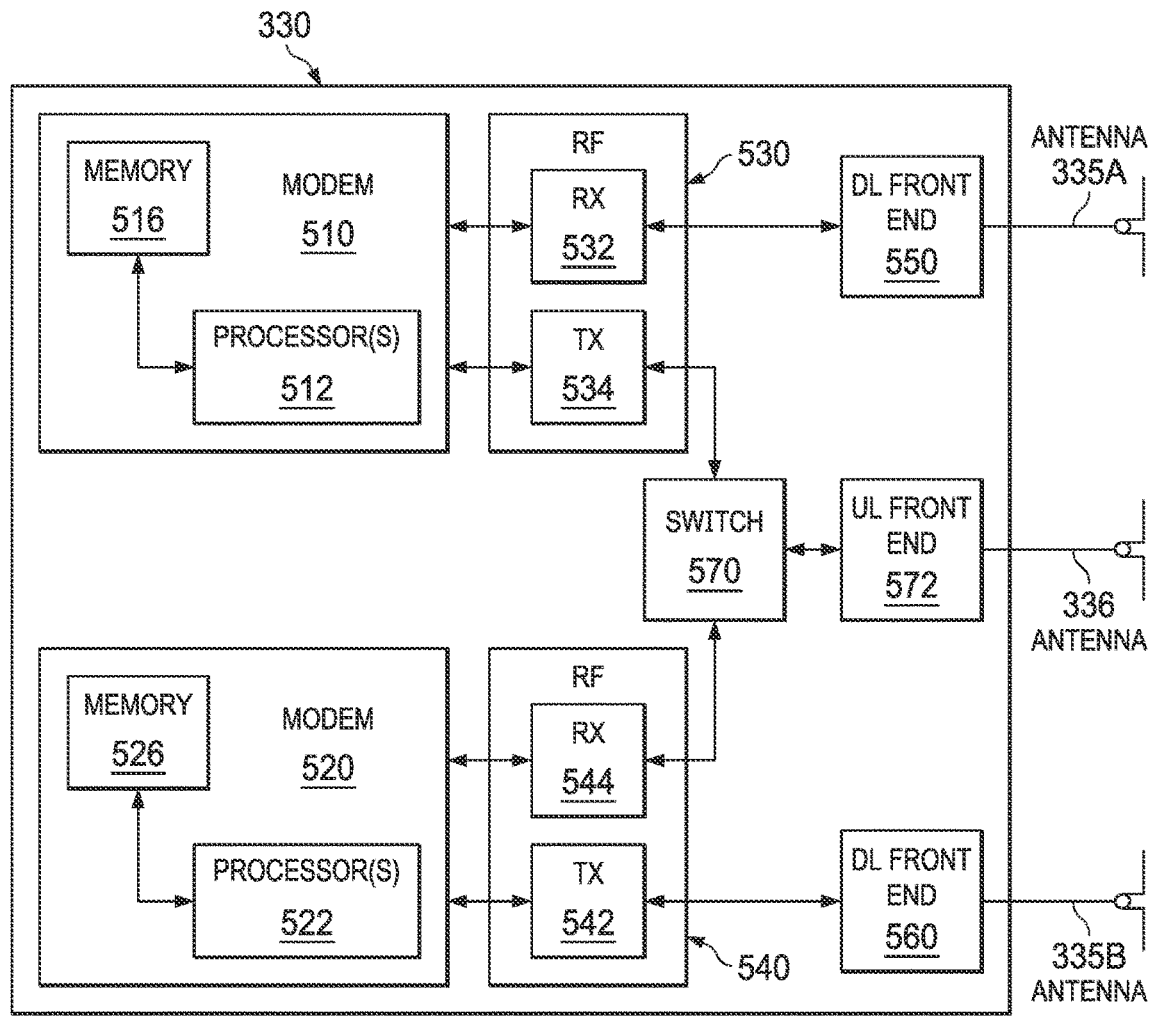
FIG. 5 illustrates an example block diagram of cellular communication circuitry, according to some aspects.

FIG. 5 illustrates an example simplified block diagram of cellular communication circuitry, according to some aspects. It is noted that the block diagram of the cellular communication circuitry of FIG. 5 is only one example of a possible cellular communication circuit, other circuits, such as circuits including or coupled to sufficient antennas for different RATs to perform uplink activities using separate antennas, or circuits including or coupled to fewer antennas, e.g., that may be shared among multiple RATs, are also possible. According to some aspects, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some aspects, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some aspects, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some aspects, receive circuitry 542 may be in communication with DL front end 560, which may include circuitry for receiving radio signals via antenna 335b.

In some aspects, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some aspects, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some aspects, the cellular communication circuitry 330 may also not include the switch 570, and the RF front end 530 or the RF front end 540 may be in communication, e.g., directly, with the UL front end 572.

Example Network Element

Figure 6:
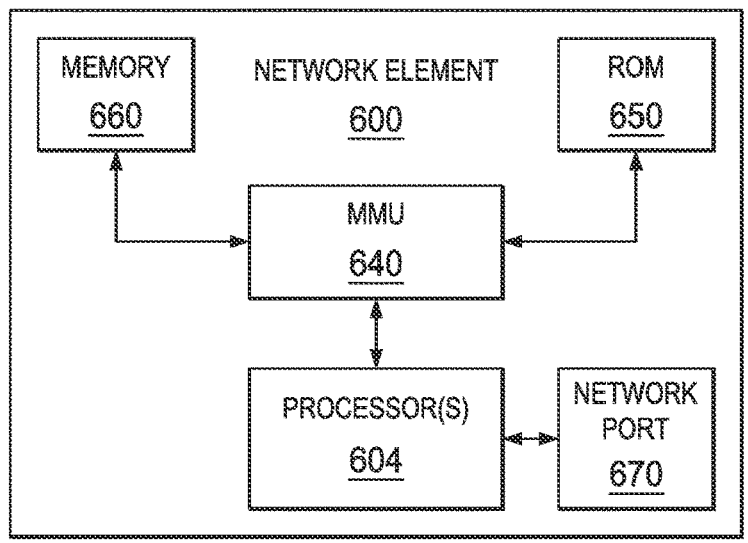
FIG. 6 illustrates an example block diagram of a network element, according to some aspects.

FIG. 6 illustrates an exemplary block diagram of a network element 600, according to some aspects. According to some aspects, the network element 600 may implement one or more logical functions/entities of a cellular core network, such as a mobility management entity (MME), serving gateway (S-GW), access and management function (AMF), session management function (SMF), network slice quota management (NSQM) function, etc. It is noted that the network element 600 of FIG. 6 is merely one example of a possible network element 600. As shown, the core network element 600 may include processor(s) 604 which may execute program instructions for the core network element 600. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The network element 600 may include at least one network port 670. The network port 670 may be configured to couple to one or more base stations and/or other cellular network entities and/or devices. The network element 600 may communicate with base stations (e.g., eNBs/gNBs) and/or other network entities/devices by means of any of various communication protocols and/or interfaces.

As described further subsequently herein, the network element 600 may include hardware and software components for implementing and/or supporting implementation of features described herein. The processor(s) 604 of the core network element 600 may be configured to implement or support implementation of part or all of the methods described herein, e.g., by executing program instructions stored on a memory medium (e.g., a nontransitory computer-readable memory medium). Alternatively, the processor 604 may be configured as a programmable hardware element, such as an FPGA (Field Programmable Gate Array), or as an ASIC (Application Specific Integrated Circuit), or a combination thereof.

Channel State Information (CSI) Feedback Over Initial Access Messages

According to certain aspects of this disclosure, an earlier CSI reporting may be requested and reported by a UE. In some cases, initial access messages may be used to request and eventually report such CSI. For example, Msg3 messages transmitted during RACH procedures may be modified to enable link adaptation for Msg4 transmission, and therefore improve the coverage performance of UE devices, be they so-called "Redcap" devices, or otherwise.

According to a first aspect, "Periodic CSI-RS"-based "Aperiodic CSI" reporting may be performed using Msg3 messages. In this approach, the configuration of periodic CSI-RS used for CSI computation maybe broadcasted in System Information Block 1 (SIB1), including a set of parameters, such as periodicity and offset, quasi-colocation (QCL) information (i.e., Transmission Configuration Indication (TCI) states), scrambling ID, power control parameters, as well as resource mapping. However, this approach has drawbacks, e.g., due to the 'always-on' nature of the RS overhead and lack of scheduling flexibility.

Thus, according to a second aspect, "Aperiodic CSI-RS"-based "Aperiodic CSI" reporting may be performed using Msg3 messages. In this approach, a set of aperiodic CSI-RS resources maybe configured by SIB1, which includes the aperiodic triggering offset configuration, the QCL, QCL configuration of QCL RS source(s), and quasi co-location type(s). In addition, a single set of CSI triggering states may be configured by SIB1, wherein the CSI triggering states can be associated with any candidate downlink (DL) bandwidth part (BWP).

In some cases, one code state of 'all zeros' may be supported to indicate that no CSI feedback on Msg3 is triggered, which gives the network full control over the signaling overhead in DL, UL, or both directions. The mapping between CSI triggering states and the configured aperiodic CSI-RS resources may also be configured by SIB1. According to some aspects, different triggering mechanisms, e.g., using DCI Format messages on PDCCH or MAC Control Element (MAC-CE) on PDSCH may be considered for CSI transmission rather than Msg3 messages, as will be explained in further detail below.

According to some such aspects, the earlier CSI feedback may be triggered specifically by a CSI request field in DCI Format 1_0, e.g., with the cyclic redundancy check (CRC) scrambled by the UE's RA-RNTI. In some designs, one CSI request field maybe newly introduced by re-purposing a number of bits (e.g., 2 bits) from the reserved bits (e.g., 16 bits) or least significant bits (LSBs) of the system frame number (SFN) information element (IE). In other designs, the value of the CSI request (e.g., if a 2-bit value is being used) may be indicated by selecting a scrambling sequences to scramble the CRC bits of DCI Format 1_0 as follows: a CSI request value of '00' corresponds to a 24-bit scrambling sequence of '0's; a CSI request value of '01' corresponds to a 24-bit scrambling sequence of '1's; a CSI request value of '10' corresponds to a 24-bit scrambling sequence of repeating '10's; and a CSI request value of '11' corresponds to a 24-bit scrambling sequence of repeating '01's. It is to be understood that these are merely exemplary CSI request values that may be used for scrambling sequence selection.

In the current design, only a quadrature phase shift keying (QPSK) modulation scheme is allowed for PDSCH scheduled by RA-RNTI. Correspondingly, the two most significant bits (MSB) of the 5-bits of the Modulation and Coding Scheme (MCS) field in DCI Format 1_0 with CRC scrambled by RA-RNTI may be re-purposed, e.g., as the aforementioned 2-bit CSI request field to trigger earlier CSI feedback, e.g., on Msg3 messages during initial access. Note that the same design principle can be applied for other numbers of CSI request field bits, e.g., 1-bit request values.

Figure 7:
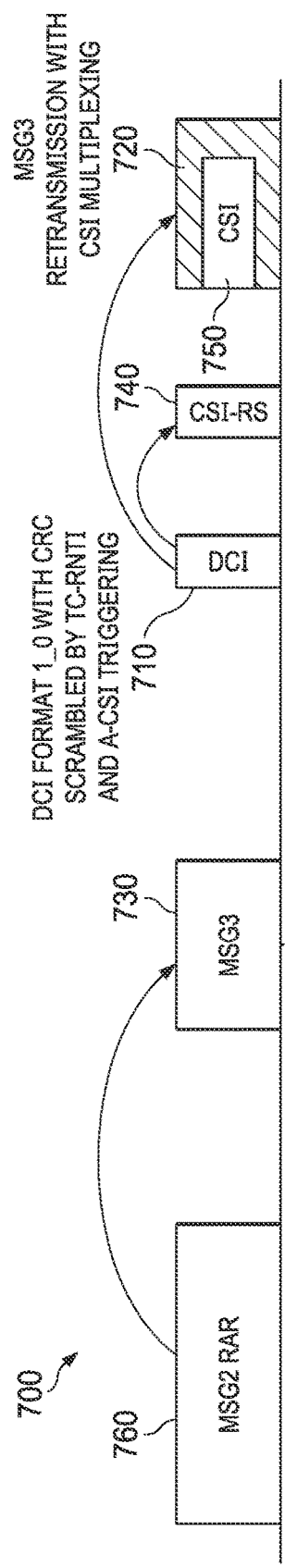
FIG. 7 illustrates an exemplary scheme for providing earlier CSI feedback, according to some aspects.

Turning now to FIG. 7, an exemplary scheme 700 for providing earlier CSI feedback is illustrated, according to some aspects. In scheme 700, the earlier CSI feedback is triggered by DCI Format 1_0 with CRC scrambled by a Temporary Cell RNTI (TC-RNTI). This scheme is mainly motivated to support UE-specific earlier CSI feedback, which is impossible using the scheme described above where the CRC is scrambled by RA-RNTI.

In some such designs, the 2-bit CSI request field may be added into DCI Format 1-0, with CRC scrambled by TC-RNTI to trigger earlier CSI feedback, on the condition that the Msg3 is retransmitted, rather than being transmitted on the initial Msg3 transmission scheduled by MAC RAR message. Alternatively, the 2-bit field of "ChannelAccesCPext" in Rel-16 DCI Format 1_0 with CRC scrambled by TC-RNTI may be re-interpreted as s "CSI request" JE for earlier CSI feedback triggering on Msg3 retransmission.

FIG. 7 provides one such example of earlier CSI feedback on Msg-3 retransmission by using the 2-bits CSI request field in DCI Format 1_0 with CRC scrambled by TC-RNTI. As shown in FIG. 7, the earlier CSI feedback is not triggered on the initial Msg3 730, as there is only a single DCI format with RA-RNTI for all UEs. Rather, for the Msg3 that is scheduled by the Msg2 RAR 760 and is not successfully received by the gNB, the DCI Format 1_0 710 with TC-RNTI is used to trigger the CSI feedback 750 on retransmitted Msg3 720, and the CSI information may then be used for subsequent Msg3/Msg4 scheduling.

Figure 8:
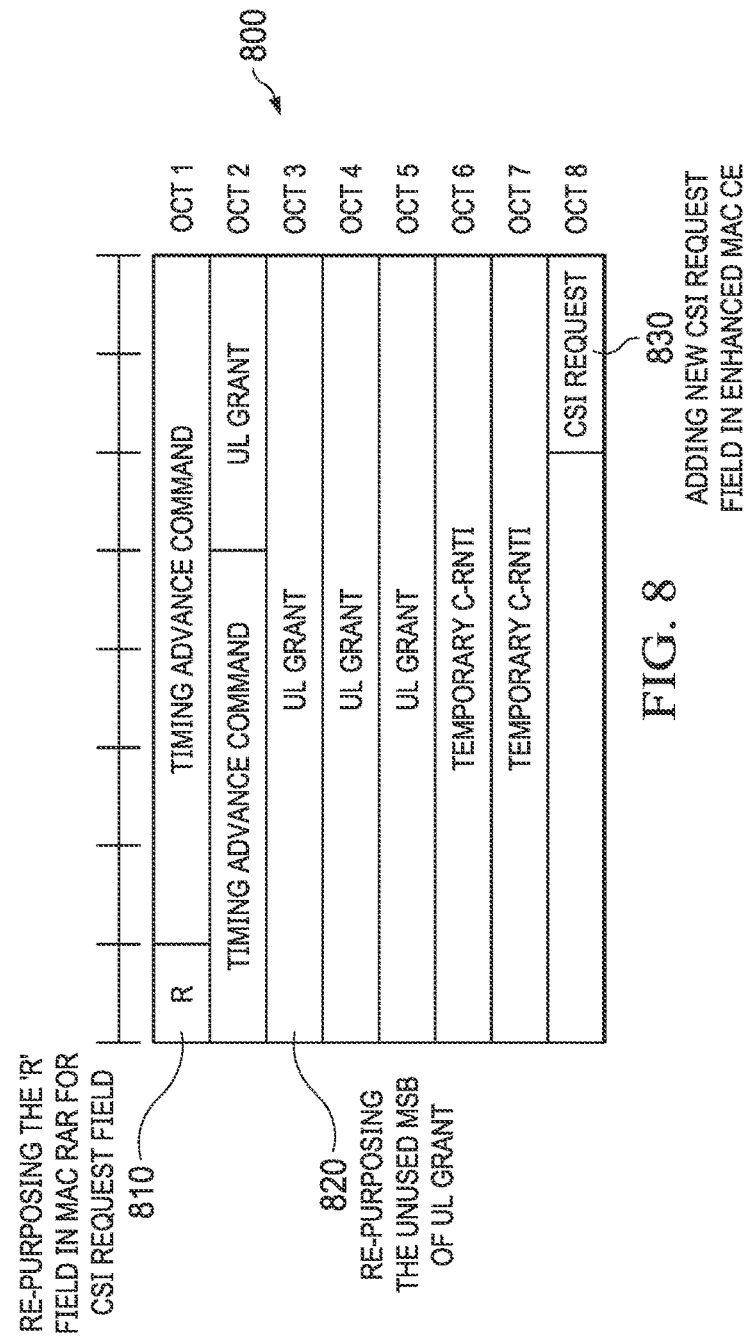
FIG. 8 illustrates an exemplary modified Medium Access Control (MAC) Random Access Response (RAR) message to trigger earlier CSI feedback, according to some aspects.

Turning now to FIG. 8, an exemplary modified Medium Access Control (MAC) Random Access Response (RAR) message to trigger earlier CSI feedback 800 is illustrated, according to some aspects. As illustrated, the MAC RAR comprises multiple octets, including a reserved or zero padding bit, 'R,' a timing advance command field, an UL grant field, and a temporary C-RNTI field.

According to a first option 810, in this aperiodic CSI reporting triggering design, the reserved or zero padding bit, 'R,' in the MAC RAR may be repurposed as a CSI request IE to trigger the early CSI feedback on Msg3. For example, this 'R' field may beset to '1' indicate that CSI feedback is triggered; otherwise, if set to '0,' no CSI feedback will be requested.

According to a second option 820, at least one unused bit of the 27 bits in the UL grant field of the current MAC RAR message may be repurposed as a CSI request IE to trigger the early CSI feedback on Msg3.

According to a third option 830, an enhanced or modified MAC-CE may be introduced with a newly-added a CSI request field, e.g., by increasing one octet from the currently final octet used for the MAC-CE, and placing the new CSI request field at that location.

In some designs, the following parameters for aperiodic CSI reporting may either be configured in SIB1 or hard encoded in the 3GPP specification:

(1) Report Quantity: In some designs, the report quantity may be hard encoded in the specification to trigger wideband CQI/PMI report with RI=1. For example, report quantity may be fixed to be "cri-RI-i1."

(2) Report Frequency Configuration/Sub-band Size: In some designs, the sub-band size 'S' may be fixed in the specification to be the largest value that the UE is allowed to be configured to via higher layers by dedicated RRC signaling. In one example, S may be equal to 8 Physical Resource Blocks (PRBs).

(3) CodebookConfig: In some designs, codebook may be fixed to be Type-I, without any configuration.

(4) CQI Table: In some designs, one of Table 5.2.2.1-2 (i.e., Target for 0.1 BLER) or Table 5.2.2.1-3 (i.e., support of lower code rate targeting for 0.00001 BLER) may be hard-encoded in specification for CSI feedback on Msg3 transmission.

Figure 9:
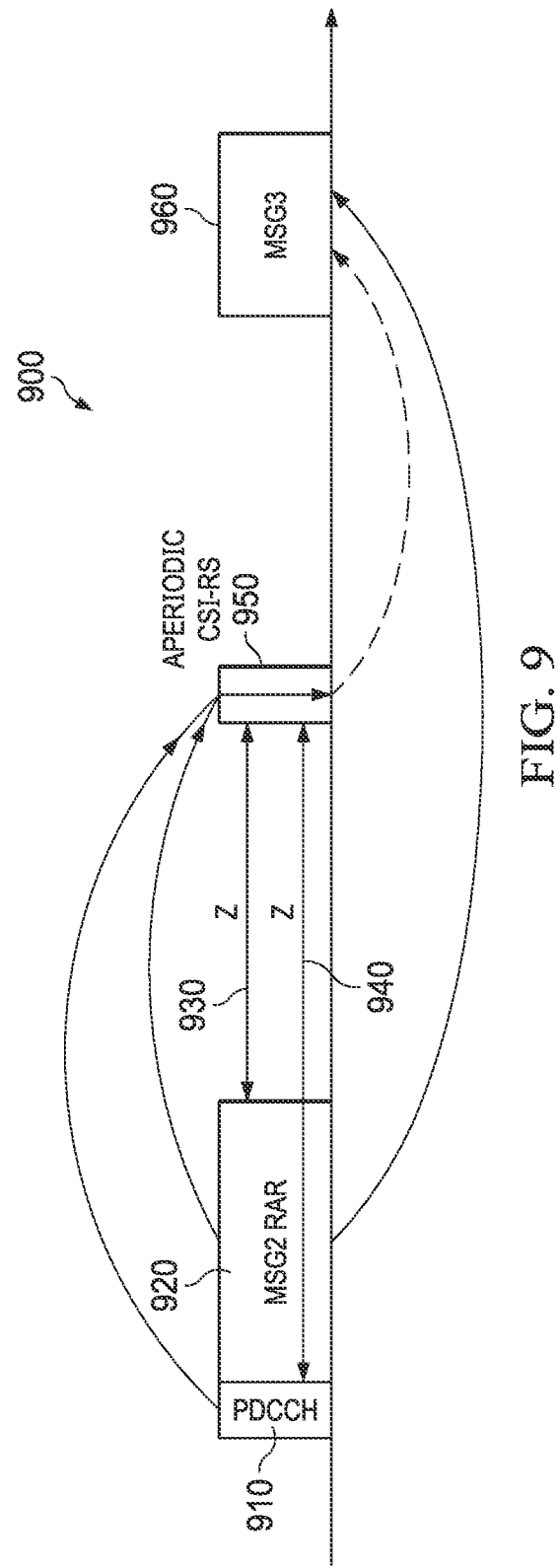
FIG. 9 illustrates an exemplary scheme for aperiodic CSI-RS timing based on a triggering signal, according to some aspects.

Turning now to FIG. 9, an exemplary scheme 900 for aperiodic CSI-RS timing based on a triggering signal is illustrated, according to some aspects. According to scheme 900, the Aperiodic CSI-RS may be transmitted some number, 'Z,' symbols after the last symbol of the triggering signaling carrying the triggering DCI, i.e., the PDCCH in case of a DCI-based triggering approach or the PDSCH, in case of a modified/enhanced MAC-CE based triggering approach.

In some designs, the value of Z may be selected by the triggering signaling from a set of values indicated in SIB1. In some designs, the UE applies the QCL assumption used for the CORESET associated with the monitored search space in which the UE detects the triggering signal for the A-CSI-RS reception. In some other designs, the interference measurement may be performed on this triggered aperiodic non-zero-power (NZP)-CSI-RS to minimize signaling overhead. Alternatively, the UE expects to be configured and triggered with a same aperiodic triggering offset of the NZP-CSI-RS for interference measurement and channel measurement.

FIG. 9 provides illustration of one such example of Aperiodic CSI-RS 950 transmission with different triggering signaling, i.e. DCI Format on PDCCH 910 with Z 940 and enhanced MAC-CE Msg2 RAR message 920 with Z 930. The UE may then report the measured CSI report on Msg3 960 that is scheduled by the Msg2 RAR message 920.

Figure 10:
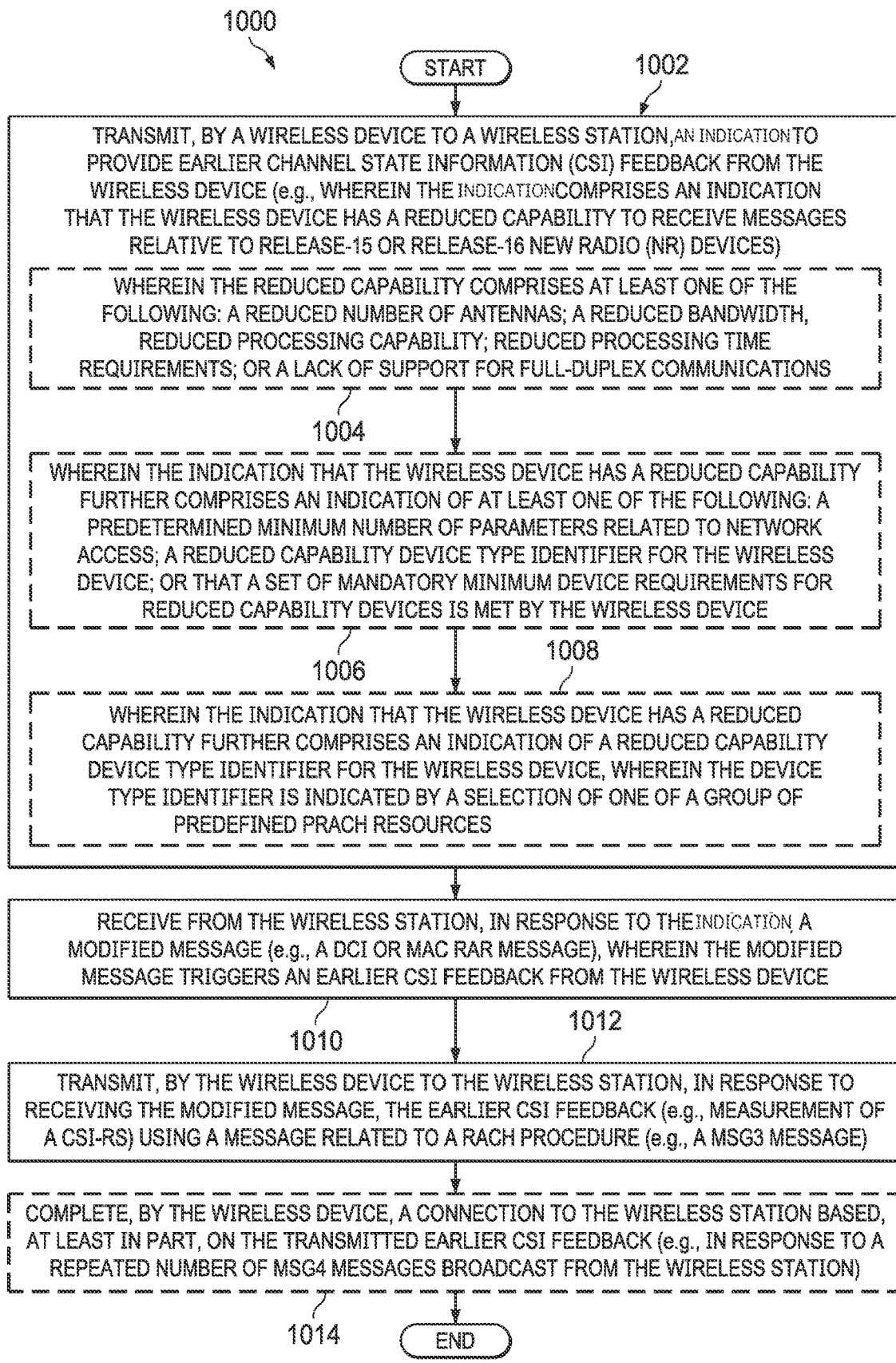
FIG. 10 is a flowchart detailing a method of specifying earlier CSI reporting by a wireless device, according to some aspects.

Exemplary Methods for Reporting and Receiving Device Capability and Triggering Earlier CSI Feedback from UEs Turning first to FIG. 10, a flowchart 1000 is shown, detailing a method of specifying earlier CSI reporting by a wireless device, according to some aspects. Method 1000 may begin by transmitting, by a wireless device to a wireless station, an indication to provide earlier CSI feedback from the wireless device (e.g., wherein the indication comprises an indication that the wireless device has a reduced capability to receive messages relative to Release-15 or Release-16 NR devices) (Step 1002).

In some cases, the reduced capability, if so indicated, may comprise at least one of the following: a reduced number of antennas; a reduced bandwidth, reduced processing capability; reduced processing time requirements; or a lack of support for full-duplex communications (Step 1004).

In other cases, the indication that the wireless device has a reduced capability may further comprise an indication of at least one of the following: a predetermined minimum number of parameters related to network access (e.g., a theoretical Redcap Device Type (RDT) Type 1, which requires a device to have maximum bandwidths of 20 MHz (FR1)/100 MHz (FR2) and 1 Rx branch (i.e., Rx chain), and theoretical RDT Type 2, which requires a device to have maximum bandwidths of 20 MHz (FR1)/100 MHz (FR2) and 2 Rx branches (i.e., Rx chains), etc.); a reduced capability device type identifier for the wireless device (wherein, e.g., all the reduced capabilities of the UE compared to normal Rel-15/Rel-16 devices are included in the RDT definition, and wherein such RDT definitions may be hard-encoded into the specification); or that a set of mandatory minimum device requirements for reduced capability devices is met by the wireless device (e.g., wherein the RDT is defined to include a mandatory requirement that all Redcap UEs are able to support RDT Type 1, as described in the example above) (Step 1006).

In still other cases, the indication that the wireless device has a reduced capability may further comprise an indication of a reduced capability device type identifier for the wireless device, wherein the device type identifier is indicated by a selection of one of a group of predefined PRACH resources (Step 1008). In some designs, the predefined PRACH resources, including RB resources or cyclic shift sequence resources, or a combination thereof, for Redcap devices maybe further divided into M groups (e.g., a Group A and Group B), where 'M' denotes the number of RDTs. Each of the M groups may be dedicated for one RDT for RACH procedures. In other designs, motivated by the fact that a Redcap UE device supports a reduced bandwidth compared to normal NR devices, the PRACH resources for Redcap devices may be allocated on different UL BWPs, e.g., with each BWP having a one-to-one association with a respective RDT. In some such designs, the location of the different UL BWPs may be signaled relative to point A by SIB1 message.

In some other such designs, the UL BWPs that are contiguous to the initial UL BWP may serve as 'initial UL BWP' for Redcap devices with PRACH resources. To explain in more detail, in existing NR systems, an initial UL BWP, referred to herein as "Normal initial UL BWP", is configured by the SIB1, which consists of a set of contiguous resource blocks (RBs) and includes a number of RBs dedicated as PRACH resources for normal NR devices. According to these designs, separate UL BWP(s), referred to herein as "Redcap initial UL BWPs" is provided in the SIB1 in addition to the "normal initial UL BWP," which is formed by aggregating a set of contiguous RBs adjacent to the RBs of Normal initial UL BWP and includes a number of RBs as dedicated PRACH resources for Redcap devices. Conceptually, the Redcap initial UL BWP may serve a similar function as the normal initial UL BWP to provide dedicated PRACH resources for the particular device type, i.e., one for Redcap devices and the other for normal NR devices. The one-to-one mapping between UL BWPs and the RDT values may be hard encoded into the specification.

It is to be understood, that the indication of a reduced capability, in particular, in the context of Step 1002 of this method is exemplary. Indeed, a wireless device may indicate a desire for earlier CSI feedback for any number of reasons, i.e., not solely due to a reduced reception (or other) capability of the wireless device. In other cases, the wireless device may actually receive an initial indication that the wireless station is capable of receiving earlier CSI feedback before the wireless device transmits any indications to the wireless station about its own capabilities and/or desire to provide earlier CSI feedback.

Next, at Step 1010, the method 1000 may proceed to receive, from the wireless station, in response to the indication, a modified message (e.g., a DCI or MAC RAR message), wherein the modified message triggers an earlier CSI feedback from the wireless device.

Next, at Step 1012, the method 1000 may proceed to transmit, by the wireless device to the wireless station, in response to receiving the modified message, the earlier CSI feedback (e.g., measurement of a CSI-RS) using a message related to a RACH procedure (e.g., a Msg3 message).

Finally, at Step 1014, the method 1000 may proceed to complete, by the wireless device, a connection, e.g., an RRC connection, to the wireless station based, at least in part, on the transmitted earlier CSI feedback (and, e.g., in response to a repeated number of Msg4 messages broadcast from the wireless station).

In other designs, rather than indicating its reduced capability via a selection of PRACH resources (as described above with reference to Step 1008), a wireless device may signal its reduced capability as part of Msg3 transmission during RACH procedure, e.g., using sparse bits or extensive bits of Msg3, i.e., bits that are not used yet in the Rel-15/Rel-16 NR Msg3 message. In such designs, the UE may initially receive, from a wireless station, an indication that the wireless station is capable of receiving earlier CSI feedback from the wireless device. This indication may, e.g., be broadcasted by the wireless station in a System Information Block #1 (SIB1), e.g., in the form of one or more enumerated bits. Later, the wireless device may transmit, to the wireless station, in response to receiving the indication, the earlier CSI feedback using a message related to a RACH procedure, and then complete a connection to the wireless station based, at least in part, on the transmitted earlier CSI feedback. In some such designs, the earlier CSI feedback may also be transmitted to the wireless station via a Msg3 message. According to some aspects, an indication that the wireless device has a reduced capability to receive messages (e.g., in the form of a reduced capability device type identifier) may be communicated to the wireless station by being concatenated with the Msg3 transmission to the wireless station that also contains the earlier CSI feedback report. As with the other designs described herein, the wireless device may also specifically be triggered to transmit the earlier CSI feedback to the wireless station in response to receiving a modified message (e.g., DCI Format 1_0 or modified MAC RAR message) from the wireless station, although explicit triggering would not be required. Alternatively, the signaling to the wireless device that it may transmit the earlier CSI feedback may also be broadcasted as part of the RACH configuration information in SIB1.

Figure 11:
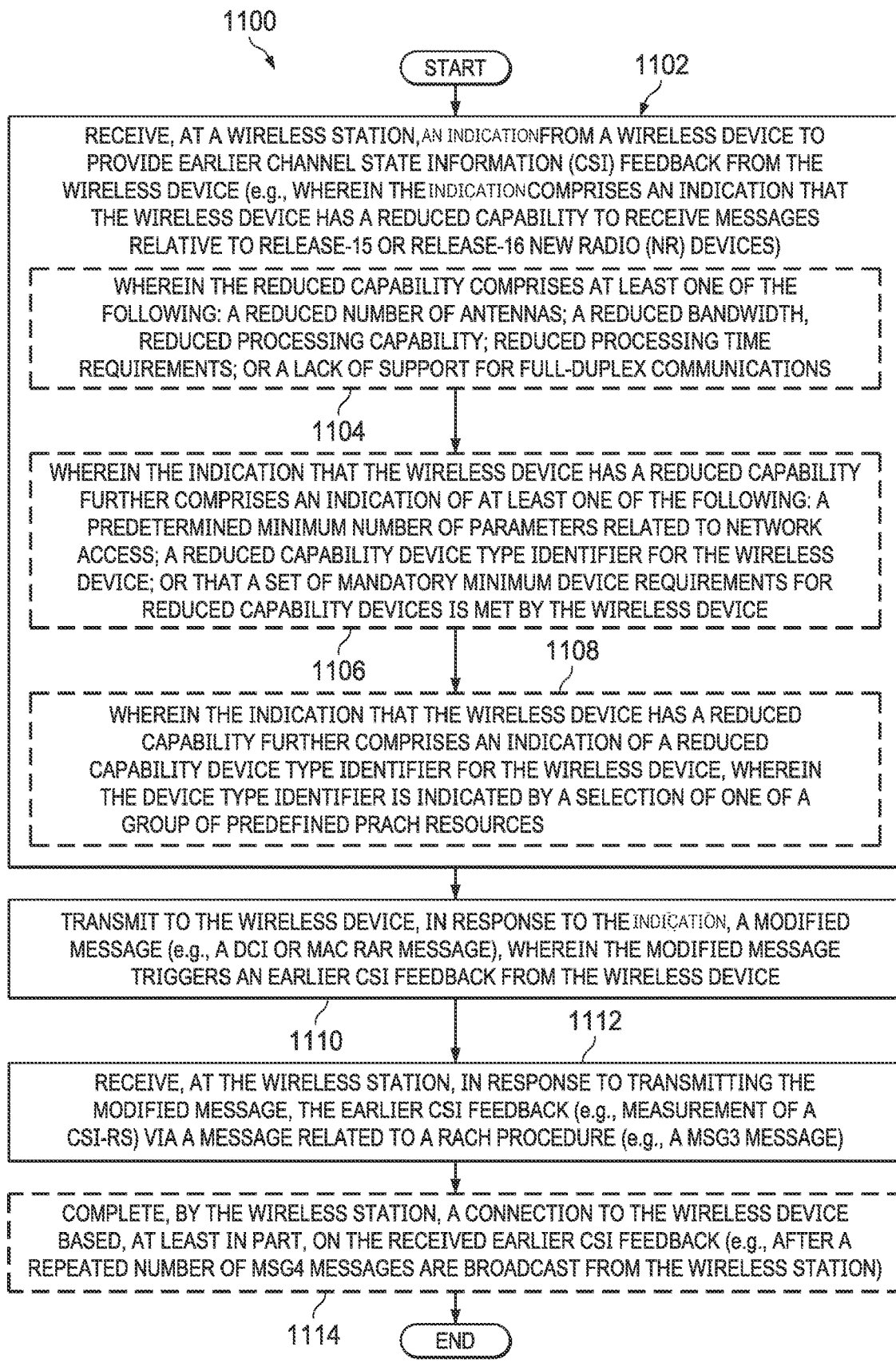
FIG. 11 is a flowchart detailing a method of specifying earlier CSI reporting by a wireless station or other network device, according to some aspects.

FIG. 11 is a flowchart detailing a method 1100 of specifying earlier CSI reporting by a wireless station or other network device, according to some aspects. Method 1100 may begin by receiving, at a wireless station, an indication from a wireless device to provide earlier CSI feedback from the wireless device (e.g., wherein the indication comprises an indication that a wireless device has a reduced capability to receive messages relative to Release-15 or Release-16 NR devices) (Step 1102).

As with FIG. 10, in some cases, the reduced capability, if so indicated, may comprise at least one of the following: a reduced number of antennas; a reduced bandwidth, reduced processing capability; reduced processing time requirements; or a lack of support for full-duplex communications (Step 1104). In other cases, the indication that the wireless device has a reduced capability may further comprise an indication of at least one of the following: a predetermined minimum number of parameters related to network access; a reduced capability device type identifier for the wireless device; or that a set of mandatory minimum device requirements for reduced capability devices is met by the wireless device (Step 1106). In still other cases, the indication that the wireless device has a reduced capability may further comprise an indication of a reduced capability device type identifier for the wireless device, wherein the device type identifier is indicated by a selection of one of a group of predefined PRACH resources or via a Msg3 message (Step 1108).

Next, at Step 1110, the method 1100 may proceed to transmit, to the wireless device, in response to the indication, a modified message (e.g., a DCI or MAC RAR message), wherein the modified message triggers an earlier CSI feedback from the wireless device.

Next, at Step 1112, the method 1100 may proceed to receive, at the wireless station, in response to transmitting the modified message, the earlier CSI feedback (e.g., measurement of a CSI-RS) via a message related to a RACH procedure (e.g., a Msg3 message).

Finally, at Step 1114, the method 1100 may proceed to complete, by the wireless station, a connection (e.g., an RRC connection) to the wireless device based, at least in part, on the received earlier CSI feedback (e.g., after a repeated number of Msg4 messages are broadcast from the wireless station).

It is noted that the dashed line boxes in FIGS. 10-11 in this application indicate the optionality of such steps or features. Further, one or more optional steps or features may be combined with each other in any desired fashion.

Examples

In the following sections, further exemplary aspects are provided.

According to Example 1, a wireless device is disclosed, comprising: a radio; and a processor operably coupled to the radio, wherein the processor is configured to: transmit, to a wireless station, a first indication to provide earlier Channel State Information (CSI) feedback from the wireless device; receive from the wireless station, in response to the first indication, a modified message, wherein the modified message triggers an earlier CSI feedback from the wireless device; transmit to the wireless station, in response to receiving the modified message, the earlier CSI feedback using a message related to a RACH procedure; and complete a connection to the wireless station based, at least in part, on the transmitted earlier CSI feedback.

Example 2 comprises the subject matter of example 1, wherein the first indication comprises a second indication that the wireless device has a reduced capability to receive messages relative to Release-15 or Release-16 New Radio (NR) devices.

Example 3 comprises the subject matter of example 2, wherein the reduced capability comprises at least one of the following: a reduced number of antennas; a reduced bandwidth, reduced processing capability; reduced processing time requirements; or a lack of support for full-duplex communications.

Example 4 comprises the subject matter of example 1, wherein the processor is further configured to: receive from the wireless station, in response to the transmitted CSI feedback, a modified Msg4 message.

Example 5 comprises the subject matter of example 4, wherein the modified Msg4 message comprises a repetition of the Msg4 message.

Example 6 comprises the subject matter of example 1, wherein the earlier CSI feedback is transmitted to the wireless station via a Msg3 message.

Example 7 comprises the subject matter of example 2, wherein the earlier CSI feedback is transmitted to the wireless station via a Msg3 message.

Example 8 comprises the subject matter of example 1, wherein the earlier CSI feedback comprises a measurement of a CSI reference signal (CSI-RS), wherein configuration information for the CSI-RS is broadcasted by the wireless station in a System Information Block #1 (SIB1).

Example 9 comprises the subject matter of example 8, wherein a set of periodic CSI-RS resources are configured in the SIB1.

Example 10 comprises the subject matter of example 8, wherein a set of aperiodic CSI-RS resources are configured in the SIB1.

Example 11 comprises the subject matter of example 10, wherein the set of aperiodic CSI-RS resources comprises resources occurring a predetermined number of symbols after a last symbol transmitting the modified message triggering the earlier CSI feedback from the wireless device.

Example 12 comprises the subject matter of example 1, wherein the modified message that triggers the earlier CSI feedback from the wireless device comprises a field in a Downlink Control Information (DCI) Format 1_0.

Example 13 comprises the subject matter of example 1, wherein the modified message that triggers the earlier CSI feedback from the wireless device comprises a field in a Downlink Control Information (DCI) Format 1_0 message scrambled with a wireless device-specific identifier.

Example 14 comprises the subject matter of example 13, wherein the earlier CSI feedback is transmitted to the wireless station via a retransmitted Msg3 message.

Example 15 comprises the subject matter of example 1, wherein the modified message that triggers the earlier CSI feedback from the wireless device comprises a modified Medium Access Control (MAC) Random Access Response (RAR) message.

Example 16 comprises the subject matter of example 15, wherein the modified MAC RAR message comprises at least one of the following: a repurposed reserved bit of the MAC RAR message, one or more repurposed bits in an uplink (UL) grant field of the MAC RAR message; or a new CSI request field added to the MAC RAR message.

Example 17 comprises the subject matter of example 2, wherein the second indication that the wireless device has a reduced capability further comprises an indication of at least one of the following: a predetermined minimum number of parameters related to network access; a reduced capability device type identifier for the wireless device; or that a set of mandatory minimum device requirements for reduced capability devices is met by the wireless device.

Example 18 comprises the subject matter of example 2, wherein the second indication that the wireless device has a reduced capability further comprises an indication of a reduced capability device type identifier for the wireless device, wherein the device type identifier is indicated by a selection of one of a group of predefined PRACH resources for performing a random access procedure with the wireless station.

Example 19 comprises the subject matter of example 18, wherein the group of predefined PRACH resources comprises a group of contiguous uplink (UL) bandwidth parts (BWPs).

According to Example 20, a wireless network communication method is disclosed, comprising: transmitting, from a wireless device to a wireless station, a first indication to provide earlier Channel State Information (CSI) feedback from the wireless device; receiving, at the wireless device, in response to the first indication, a modified message from the wireless station, wherein the modified message triggers an earlier Channel State Information (CSI) feedback from the wireless device to the wireless station; transmitting, by the wireless device, in response to receiving the modified message, the earlier CSI feedback to the wireless station using a message related to a RACH procedure; and completing a connection between the wireless device and the wireless station based, at least in part, on the transmitted earlier CSI feedback.

Example 21 comprises the subject matter of example 20, wherein the first indication comprises a second indication that the wireless device has a reduced capability to receive messages relative to Release-15 or Release-16 New Radio (NR) devices.

Example 22 comprises the subject matter of example 21, wherein the reduced capability comprises at least one of the following: a reduced number of antennas; a reduced bandwidth, reduced processing capability; reduced processing time requirements; or a lack of support for full-duplex communications.

Example 23 comprises the subject matter of example 20, wherein the method further comprises: receiving from the wireless station, in response to the transmitted CSI feedback, a modified Msg4 message.

Example 24 comprises the subject matter of example 23, wherein the modified Msg4 message comprises a repetition of the Msg4 message.

Example 25 comprises the subject matter of example 20, wherein the earlier CSI feedback is transmitted to the wireless station via a Msg3 message.

Example 26 comprises the subject matter of example 21, wherein the earlier CSI feedback is transmitted to the wireless station via a Msg3 message.

Example 27 comprises the subject matter of example 20, wherein the earlier CSI feedback comprises a measurement of a CSI reference signal (CSI-RS), wherein configuration information for the CSI-RS is broadcasted by the wireless station in a System Information Block #1 (SIB1).

Example 28 comprises the subject matter of example 27, wherein a set of periodic CSI-RS resources are configured in the SIB1.

Example 29 comprises the subject matter of example 27, wherein a set of aperiodic CSI-RS resources are configured in the SIB1.

Example 30 comprises the subject matter of example 29, wherein the set of aperiodic CSI-RS resources comprises resources occurring a predetermined number of symbols after a last symbol transmitting the modified message triggering the earlier CSI feedback from the wireless device.

Example 31 comprises the subject matter of example 20, wherein the modified message that triggers the earlier CSI feedback from the wireless device comprises a field in a Downlink Control Information (DCI) Format 1_0.

Example 32 comprises the subject matter of example 20, wherein the modified message that triggers the earlier CSI feedback from the wireless device comprises a field in a Downlink Control Information (DCI) Format 1_0 message scrambled with a wireless device-specific identifier.

Example 33 comprises the subject matter of example 32, wherein the earlier CSI feedback is transmitted to the wireless station via a retransmitted Msg3 message.

Example 34 comprises the subject matter of example 20, wherein the modified message that triggers the earlier CSI feedback from the wireless device comprises a modified Medium Access Control (MAC) Random Access Response (RAR) message.

Example 35 comprises the subject matter of example 34, wherein the modified MAC RAR message comprises at least one of the following: a repurposed reserved bit of the MAC RAR message; one or more repurposed bits in an uplink (UL) grant field of the MAC RAR message; or a new CSI request field added to the MAC RAR message.

Example 36 comprises the subject matter of example 21, wherein the second indication that the wireless device has a reduced capability further comprises an indication of at least one of the following: a predetermined minimum number of parameters related to network access; a reduced capability device type identifier for the wireless device; or that a set of mandatory minimum device requirements for reduced capability devices is met by the wireless device.

Example 37 comprises the subject matter of example 21, wherein the second indication that the wireless device has a reduced capability further comprises an indication of a reduced capability device type identifier for the wireless device, wherein the device type identifier is indicated by a selection of one of a group of predefined PRACH resources for performing a random access procedure with the wireless station.

Example 38 comprises the subject matter of example 37, wherein the group of predefined PRACH resources comprises a group of contiguous UL BWPs.

According to Example 39 a wireless station is disclosed, comprising: a radio; and a processor operably coupled to the radio, wherein the processor is configured to: receive, at the wireless station, a first indication from a wireless device to provide earlier Channel State Information (CSI) feedback from the wireless device, transmit, to the wireless device, in response to the first indication, a modified message, wherein the modified message triggers an earlier Channel State Information (CSI) feedback from the wireless device; receive, at the wireless station, the earlier CSI feedback via a message related to a RACH procedure; and complete a connection to the wireless device based, at least in part, on the received earlier CSI feedback.

Example 40 comprises the subject matter of example 39, wherein the first indication comprises a second indication that the wireless device has a reduced capability to receive messages relative to Release-15 or Release-16 New Radio (NR) devices.

Example 41 comprises the subject matter of example 40, wherein the reduced capability comprises at least one of the following: a reduced number of antennas; a reduced bandwidth, reduced processing capability; reduced processing time requirements; or a lack of support for full-duplex communications.

Example 42 comprises the subject matter of example 39, wherein the processor is further configured to: transmit to the wireless device, in response to the received CSI feedback, a modified Msg4 message.

Example 43 comprises the subject matter of example 42, wherein the modified Msg4 message comprises a repetition of the Msg4 message.

Example 44 comprises the subject matter of example 39, wherein the earlier CSI feedback is received at the wireless station via a Msg3 message.

Example 45 comprises the subject matter of example 40, wherein the earlier CSI feedback is received at the wireless station via a Msg3 message.

Example 46 comprises the subject matter of example 39, wherein the earlier CSI feedback comprises a measurement of a CSI reference signal (CSI-RS), wherein configuration information for the CSI-RS is broadcasted by the wireless station in a System Information Block #1 (SIB1).

Example 47 comprises the subject matter of example 46, wherein a set of periodic CSI-RS resources are configured in the SIB1.

Example 48 comprises the subject matter of example 46, wherein a set of aperiodic CSI-RS resources are configured in the SIB1.

Example 49 comprises the subject matter of example 48, wherein the set of aperiodic CSI-RS resources comprises resources occurring a predetermined number of symbols after a last symbol transmitting the modified message triggering the earlier CSI feedback from the wireless device.

Example 50 comprises the subject matter of example 39, wherein the modified message that triggers the earlier CSI feedback from the wireless device comprises a field in a Downlink Control Information (DCI) Format 1_0.

Example 51 comprises the subject matter of example 39, wherein the modified message that triggers the earlier CSI feedback from the wireless device comprises a field in a Downlink Control Information (DCI) Format 1_0 message scrambled with a wireless device-specific identifier.

Example 52 comprises the subject matter of example 51, wherein the earlier CSI feedback is received at the wireless station via a retransmitted Msg3 message.

Example 53 comprises the subject matter of example 39, wherein the modified message that triggers the earlier CSI feedback from the wireless device comprises a modified Medium Access Control (MAC) Random Access Response (RAR) message.

Example 54 comprises the subject matter of example 53, wherein the modified MAC RAR message comprises at least one of the following: a repurposed reserved bit of the MAC RAR message; one or more repurposed bits in an uplink (UL) grant field of the MAC RAR message; or a new CSI request field added to the MAC RAR message.

Example 55 comprises the subject matter of example 40, wherein the second indication that the wireless device has a reduced capability further comprises an indication of at least one of the following: a predetermined minimum number of parameters related to network access; a reduced capability device type identifier for the wireless device; or that a set of mandatory minimum device requirements for reduced capability devices is met by the wireless device.

Example 56 comprises the subject matter of example 40, wherein the second indication that the wireless device has a reduced capability further comprises an indication of a reduced capability device type identifier for the wireless device, wherein the device type identifier is indicated by a selection of one of a group of predefined PRACH resources for performing a random access procedure with the wireless station.

Example 57 comprises the subject matter of example 56, wherein the group of predefined PRACH resources comprises a group of contiguous UL BWPs.

According to Example 58, a wireless device is disclosed, comprising: a radio; and a processor operably coupled to the radio, wherein the processor is configured to: receive, from a wireless station, an indication that the wireless station is capable of receiving earlier CSI feedback from the wireless device; transmit to the wireless station, in response to receiving the indication, the earlier CSI feedback using a message related to a RACH procedure, and complete a connection to the wireless station based, at least in part, on the transmitted earlier CSI feedback.

Example 59 comprises the subject matter of example 58, wherein the indication that the wireless station is capable of receiving earlier CSI feedback from the wireless device is broadcasted by the wireless station in a System Information Block #1 (SIB1).

Example 60 comprises the subject matter of example 59, wherein the indication that the wireless station is capable of receiving earlier CSI feedback from the wireless device further comprises one or more enumerated bits broadcasted in the SIB1.

Example 61 comprises the subject matter of example 58, wherein the earlier CSI feedback is transmitted to the wireless station via a Msg3 message.

Example 62 comprises the subject matter of example 61, wherein the Msg3 message is concatenated with an indication that the wireless device has a reduced capability to receive messages relative to Release-15 or Release-16 New Radio (NR) devices.

Example 63 comprises the subject matter of example 62, wherein the indication that the wireless device has a reduced capability comprises a reduced capability device type identifier for the wireless device.

Example 64 comprises the subject matter of example 62, wherein the reduced capability comprises at least one of the following: a reduced number of antennas; a reduced bandwidth, reduced processing capability; reduced processing time requirements; or a lack of support for full-duplex communications.

Example 65 comprises the subject matter of example 58, wherein the processor is further configured to: receive from the wireless station, in response to the transmitted CSI feedback, a modified Msg4 message.

Example 66 comprises the subject matter of example 65, wherein the modified Msg4 message comprises a repetition of the Msg4 message.

Example 67 comprises the subject matter of example 58, wherein the processor is further configured to: transmit the earlier CSI feedback to the wireless station in further response to receiving a modified message from the wireless station, wherein the modified message triggers the earlier CSI feedback.

Example 68 comprises the subject matter of example 67, wherein the modified message comprises at least one of: a field in a Downlink Control Information (DCI) Format 1_0; or a modified MAC RAR message.

Yet another exemplary aspect may include a method performing any or all parts of the preceding examples.

A yet further exemplary aspect may include a non-transitory computer-accessible memory medium comprising program instructions which, when executed at a device, cause the device to implement any or all parts of any of the preceding Examples.

A still further exemplary aspect may include a computer program comprising instructions for performing any or all parts of any of the preceding examples.

Yet another exemplary aspect may include an apparatus comprising means for performing any or all of the elements of any of the preceding examples.

Still another exemplary aspect may include an apparatus comprising a processor configured to cause a device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Aspects of the present disclosure may be realized in any of various forms. For example, some aspects may be realized as a computer-implemented method, a computer-readable memory medium, or a computer system. Other aspects may be realized using one or more custom-designed hardware devices such as ASICs. Still other aspects may be realized using one or more programmable hardware elements such as FPGAs.

In some aspects, a non-transitory computer-readable memory medium may be configured so that it stores program instructions and/or data, where the program instructions, if executed by a computer system, cause the computer system to perform a method, e.g., any of a method aspects described herein, or, any combination of the method aspects described herein, or, any subset of any of the method aspects described herein, or, any combination of such subsets.

In some aspects, a device (e.g., a UE 106, a BS 102, a network element 600) may be configured to include a processor (or a set of processors) and a memory medium, where the memory medium stores program instructions, where the processor is configured to read and execute the program instructions from the memory medium, where the program instructions are executable to implement any of the various method aspects described herein (or, any combination of the method aspects described herein, or, any subset of any of the method aspects described herein, or, any combination of such subsets). The device may be realized in any of various forms.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device comprising:
   a radio; and
   a processor operably coupled to the radio,
   wherein the processor is configured to cause the wireless device to:
      transmit, via the radio and to a wireless station, a first indication to provide earlier Channel State Information (CSI) feedback from the wireless device, wherein the first indication comprises an indication of a reduced capability device type identifier for the wireless device, wherein the reduced capability device type identifier indicates a selection of a group of a plurality of groups of predefined physical random access channel (PRACH) resources for performing a random access procedure with the wireless station, and wherein the group of PRACH resources is associated with a particular reduced capability device type identifier;
      receive from the wireless station, via the radio and in response to the first indication, a modified message, wherein the modified message triggers an earlier CSI feedback from the wireless device; and
      transmit, via the radio, to the wireless station, in response to receiving the modified message, the earlier CSI feedback using at least a portion of the group of PRACH resources.

2. The wireless device of claim 1, wherein the first indication comprises a second indication that the wireless device has a reduced capability to receive messages relative to Release-15 or Release-16 New Radio (NR) devices.

3. The wireless device of claim 2, wherein the reduced capability comprises at least one of the following: a reduced number of antennas; a reduced bandwidth, reduced processing capability; reduced processing time requirements; or a lack of support for full-duplex communications.

4. The wireless device of claim 2, wherein the earlier CSI feedback is transmitted via the radio to the wireless station via a Msg3 message.

5. The wireless device of claim 1, wherein the processor is further configured to:
   receive from the wireless station, via the radio and in response to the transmitted CSI feedback, a modified Msg4 message.

6. The wireless device of claim 5, wherein the modified Msg4 message comprises a repetition of the Msg4 message.

7. The wireless device of claim 1, wherein the earlier CSI feedback is transmitted to the wireless station via a Msg3 message.

8. A wireless network communication method comprising:
   transmitting, from a wireless device to a wireless station, a first indication to provide earlier Channel State Information (CSI) feedback from the wireless device, wherein the first indication comprises an indication of a reduced capability device type identifier for the wireless device, wherein the reduced capability device type identifier indicates a selection of one-a group of a plurality of groups of predefined physical random access channel (PRACH) resources for performing a random access procedure with the wireless station, and wherein the group of PRACH resources is associated with a particular reduced capability device type identifier;

receiving, at the wireless device, in response to the first indication, a modified message from the wireless station, wherein the modified message triggers an earlier Channel State Information (CSI) feedback from the wireless device to the wireless station; and transmitting, by the wireless device, in response to receiving the modified message, the earlier CSI feedback to the wireless station using at least a portion of the group of PRACH resources.

9. The method of claim 8, wherein the modified message that triggers the earlier CSI feedback from the wireless device comprises a field in a Downlink Control Information (DCI) Format 1_0.

10. The method of claim 8, wherein the modified message that triggers the earlier CSI feedback from the wireless device comprises a field in a Downlink Control Information (DCI) Format 1_0 message scrambled with a wireless device-specific identifier.

11. The method of claim 10, wherein the earlier CSI feedback is transmitted to the wireless station via a retransmitted Msg3 message.

12. The method of claim 8, wherein the modified message that triggers the earlier CSI feedback from the wireless device comprises a modified Medium Access Control (MAC) Random Access Response (RAR) message.

13. The method of claim 12, wherein the modified MAC RAR message comprises at least one of the following: a repurposed reserved bit of the MAC RAR message; one or more repurposed bits in an uplink (UL) grant field of the MAC RAR message; or a new CSI request field added to the MAC RAR message.

14. A wireless device comprising:
a radio; and
a processor operably coupled to the radio,
wherein the processor is configured to cause the wireless device to:

receive, via the radio and from a wireless station, an indication that the wireless station is capable of receiving earlier CSI feedback from the wireless device; and transmit, via the radio to the wireless station, and in response to receiving the indication, the earlier CSI feedback using a message related to a physical random access channel (PRACH) procedure, wherein transmitting the earlier CSI feedback further comprises selecting a group of a plurality of groups of predefined PRACH resources, and wherein the group of PRACH resources is associated with a particular reduced capability device type identifier.

15. The wireless device of claim 14, wherein the indication that the wireless station is capable of receiving earlier CSI feedback from the wireless device is broadcasted by the wireless station in a System Information Block #1 (SIB1).

16. The wireless device of claim 15, wherein the indication that the wireless station is capable of receiving earlier CSI feedback from the wireless device further comprises one or more enumerated bits broadcasted in the SIB1.

17. The wireless device of claim 14, wherein the earlier CSI feedback is transmitted via the radio to the wireless station via a Msg3 message.

18. The wireless device of claim 14, wherein the processor is further configured to:
receive from the wireless station, via the radio and in response to the transmitted CSI feedback, a modified Msg4 message.

19. The wireless device of claim 18, wherein the modified Msg4 message comprises a repetition of the Msg4 message.

20. The wireless device of claim 14, wherein the processor is further configured to:
transmit the earlier CSI feedback to the wireless station via the radio in further response to receiving a modified message from the wireless station via the radio, wherein the modified message triggers the earlier CSI feedback.

* * * * *